(12) United States Patent
Wermeister

(10) Patent No.: US 7,549,825 B2
(45) Date of Patent: Jun. 23, 2009

(54) CUTTING INSERT AND ASSOCIATED MILLING CUTTER

(75) Inventor: Günter Wermeister, Meerbusch (DE)

(73) Assignee: Sandvik Intellectual Property Aktiebolag, Sandviken (SE)

( * ) Notice: Subject to any disclaimer, the term of this patent is extended or adjusted under 35 U.S.C. 154(b) by 275 days.

(21) Appl. No.: 10/203,509

(22) PCT Filed: Feb. 9, 2001

(86) PCT No.: PCT/EP01/01414

§ 371 (c)(1),
(2), (4) Date: Dec. 16, 2002

(87) PCT Pub. No.: WO01/58633

PCT Pub. Date: Aug. 16, 2001

(65) Prior Publication Data

US 2003/0113175 A1 Jun. 19, 2003

(30) Foreign Application Priority Data

Feb. 12, 2000 (DE) .................................. 100 06 381

(51) Int. Cl.
*B23B 27/00* (2006.01)
*B28D 1/00* (2006.01)
(52) U.S. Cl. .......................... 407/113; 407/66; 407/67; 407/34

(58) Field of Classification Search ................. 407/113, 407/114, 115, 116, 100, 36, 38, 44, 47
See application file for complete search history.

(56) References Cited

U.S. PATENT DOCUMENTS

| 2,483,320 | A | * | 9/1949 | McHale | 57/116 |
| 3,701,187 | A | | 10/1972 | Erkfritz | |
| 3,762,005 | A | | 10/1973 | Erkfritz | |
| 3,911,543 | A | * | 10/1975 | Sorice | 407/77 |
| 4,182,587 | A | | 1/1980 | Striegl | |
| 4,867,616 | A | | 9/1989 | Jakubowicz | |
| 5,443,335 | A | | 8/1995 | Shimano et al. | |
| 6,109,838 | A | * | 8/2000 | Riviere | 407/36 |
| 6,764,254 | B2 | * | 7/2004 | Emoto et al. | 407/34 |

FOREIGN PATENT DOCUMENTS

| DE | 28 05 670 | | 8/1978 | | |
| DE | 03730943 | * | 4/1989 | | 407/13 |
| DE | 197 04 931 | | 3/1998 | | |
| DE | 197 43 971 | | 4/1999 | | |
| GB | 2 057 940 | | 4/1981 | | |

* cited by examiner

*Primary Examiner*—Willmon Fridie
(74) *Attorney, Agent, or Firm*—Drinker Biddle & Reath LLP

(57) ABSTRACT

A cutting insert used for cutting metal, especially for milling camshafts. The insert comprises at least one cutting edge that is formed by the intersection of a face with a flank. The cutting edges extend at an angle deviating from 90 degrees relative to the cutting direction of the cutting insert in order to reduce the noise level during machining.

33 Claims, 7 Drawing Sheets

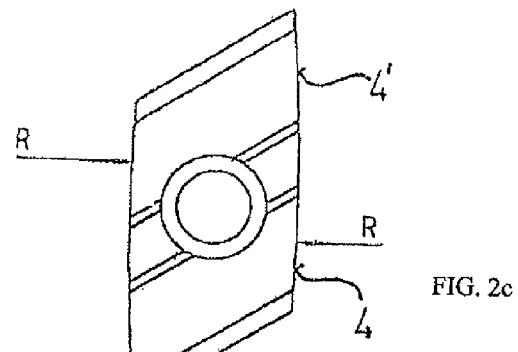
FIG. 2c
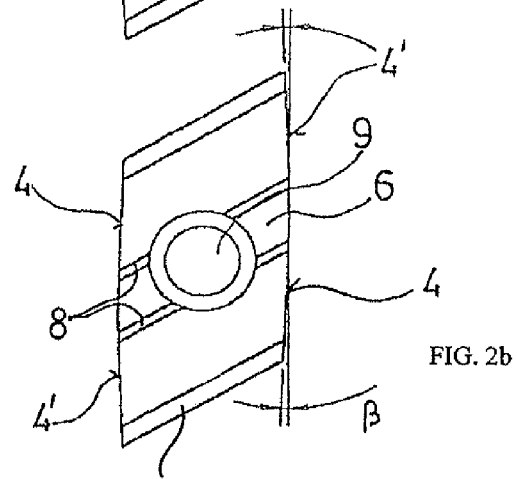
FIG. 2b
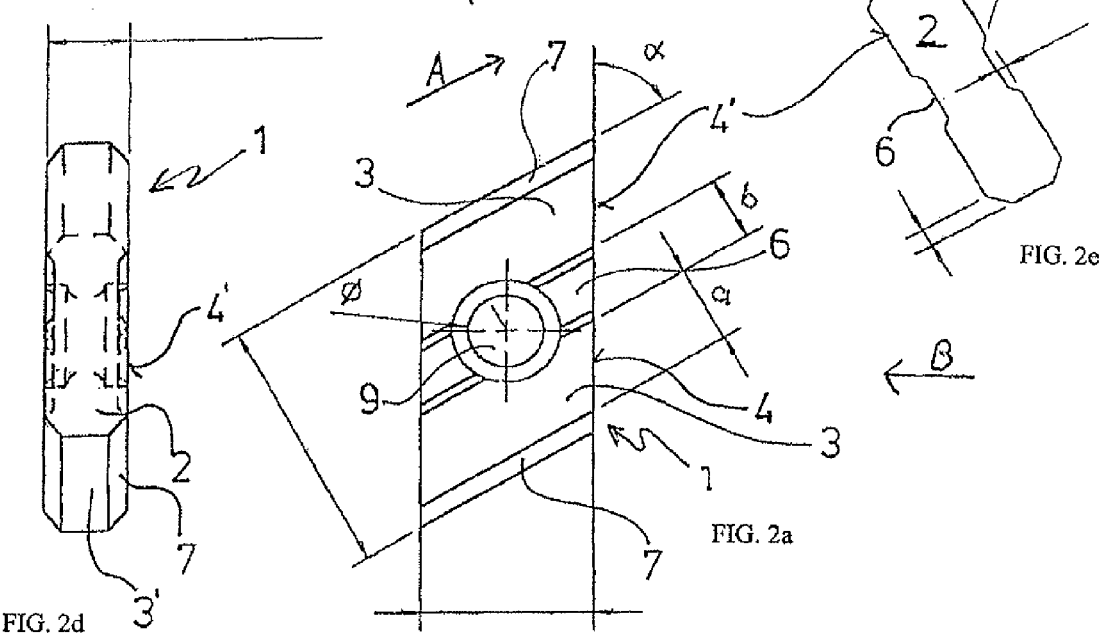
FIG. 2a
FIG. 2d
FIG. 2e

CUTTING INSERT AND ASSOCIATED MILLING CUTTER

BACKGROUND OF THE INVENTION

The present invention concerns a cutting insert for cutting metal machining, in particular for milling for example camshafts, comprising at least one cutting edge formed by the intersection of a rake face with a flank. The present invention also concerns a milling cutter for the cutting machining of a metal workpiece, wherein the milling cutter comprises a tool body which is substantially cylindrical or in the form of a circular disk having a plurality of receiving pockets for cutting inserts which are distributed along the periphery of the tool body.

Corresponding cutting bits or inserts and a corresponding milling tool are known for example from U.S. Pat. No. 4,867,616. In the known milling cutter the cutting inserts are approximately of a square basic shape with interrupted cutting edges which are bevelled in the corner regions. The individual plates are distributed in alternate axially slightly displaced relationship along the periphery of a tool body which is cylindrical or in the form of a disk, so that overall two different groups of cutting inserts are arranged in such a way that the one group of cutting inserts projects in the one axial direction and the other group of cutting inserts projects in the other axial direction, beyond the thickness of the disk-shaped tool body. All cutting inserts also project slightly in the radial direction beyond the radius of the main tool body and they are received in corresponding recesses or receiving pockets in the main body of the tool. In that arrangement the active cutting edges are not oriented exactly parallel to the axis of the tool body but are slightly inclined relative to the axis, that is to say they are slightly tilted in a plane which is defined by the associated radius vector and the axis of the tool body.

The displacement of the two cutting insert groups relative to each other provides that the cutting edge portions of the one group of cutting inserts cut substantially in the gaps of interruptions formed by the interrupted cutting edges of the other group of cutting inserts. That provides that, even when both groups of cutting inserts overlap to a relatively great extent in the axial direction, the cutting inserts are nonetheless substantially uniformly loaded along their entire (even if interrupted) cutting edges.

The cutting inserts can be turned and have up to eight (interrupted) cutting edges. Corresponding milling cutters can be used to cut for example slots or grooves in workpieces. A corresponding milling cutter is only limitedly suitable for the production of camshafts and at any event would require a plurality of successive working operations in order to produce the correct cam profile.

In the recent past the quality of the cutting inserts or the material from which they are produced has increasingly improved so that accordingly it has also become possible to use further increasing machining speeds without the risk of the cutting inserts being damaged or suffering from excessively rapid wear. It will be noted however that these higher machining speeds also entail the disadvantage of an increased production of noise. In the case of almost all milling cutters and almost all milling operations, the cutting edges or at least a part of the cutting edges are or is not permanently in engagement with the workpiece which is in the course of being machined, but on the contrary the cutting edges come into engagement and out of engagement again with the workpiece intermittently, the engagement position extending only over a given angular region of the corresponding rotating milling tool. After a rotary movement through a given angle, depending on the nature of the machining operation and the depth of engagement, the previously active cutting edges of a cutting bit initially come out of engagement with the workpiece until, after a rotary movement through a further angle which in total generally affords an angle of 360° with the first-mentioned angle, they come into engagement with the workpiece again, and the corresponding process begins afresh. That applies in regard to each individual cutting insert arranged along the periphery of a corresponding milling cutter, in which case during a workpiece machining operation a respective part of the cutting inserts which are distributed over the periphery are in engagement with the workpiece while another part is just out of engagement therewith.

Engagement of an active cutting edge with the workpiece is generally effected abruptly after a corresponding rotary movement of the tool body, insofar as the respectively active cutting edge which is substantially parallel to the axis comes into engagement over its entire length simultaneously with the workpiece and a chip or a plurality of chips are detached from the workpiece material during the further rotary movement in the workpiece material. The moment of coming into engagement, by virtue of the cutting edges striking against the workpiece or the surface to be machined, causes a noticeably audible noise and the large number of cutting edges of the individual cutting inserts, which come into engagement with the workpiece surface in rapid succession during a rotation of a milling cutter, produce a considerable amount of noise in the case of a milling cutter which is rotating fast.

In that respect industrial health and safety requirements provide that a noise level of 80 decibels is not to be exceeded by corresponding tools, in which respect the noise level is measured at precisely defined distances relative to the workpiece and the milling cutter. With an increasing machining speed, that is to say with an increasing speed of rotation of the tool bodies or with an increase in the diameter of the rotating tool bodies, the noise level produced further increases. In addition the relevant authorities in Europe are endeavouring to further reduce the maximum allowable noise level of 80 decibels to 75 decibels. This means that the machining speed and therewith also the productivity of corresponding machines would have to be reduced below the value which would otherwise be technically possible.

OBJECTS AND FEATURES OF THE INVENTION

In comparison with that state of the art the object of the present invention is to provide a cutting insert for a milling cutter and a corresponding milling cutter, in the use of which, even when making use of the full load capacity, it is possible to achieve a considerable reduction in the noise level in high-speed milling. It will be appreciated that this is to apply, even when using cutting inserts with the highest available fracture strength and wear resistance, which purely technically permit maximum machining speeds.

In regard to the cutting insert itself the object of the invention is attained in that the respectively active cutting edge extends at an angle deviating from 90° relative to the cutting direction. This means in specific terms that, in the case of a corresponding, generally rotational movement of the cutting insert or the cutting edge about the axis of a corresponding tool, the cutting edge does not simultaneously come into engagement over its full length with the workpiece, but firstly, by virtue of the inclination of the cutting edge with respect to the direction extending perpendicularly to the cutting direction, a furthest leading portion of the cutting edge at an end thereof comes into engagement with the workpiece and it is only upon further rotary movement that the subsequent portions of the cutting edge successively come into engagement with the workpiece. By virtue of the fact that the entire cutting edge does not abruptly come into engagement with the workpiece the corresponding impact or chatter noise is considerably damped, in which respect it will be noted that it must be presumed that the angle of inclination between the cutting edge and a line perpendicular to the cutting direction must exceed a certain minimum value as otherwise a unitary sound pulse is nonetheless produced, which originates substantially from the entire cutting edge. An angle of between 40 and 85° of the cutting edge, relative to the cutting direction has proven to be appropriate, in particular between 50 and 75°, while angles around 60°, that is to say in the range of between 55 and 65° are particularly preferred.

A preferred embodiment of the invention is one in which the flanks or relief faces have structures which extend substantially in the cutting direction of the cutting insert, that is to say they adjoin the cutting edge at an angle which is markedly different from 90°. A further preferred embodiment of the invention is one in which the cutting edges are interrupted and each comprise at least two cutting edge portions which are separate but which extend substantially in the same direction and between which there is a gap or interruption. The flank or relief face then has a correspondingly structured cross-section which remains constant as viewed in the cutting direction. For example it is possible to provide at the ends of the cutting edges, cutting corners or chamfers which are adjoined by corresponding chamfers or edges respectively on the flanks.

The internal spacing between the individual cutting edge portions of a cutting insert, which respectively belong together to the same cutting edge, in the preferred embodiment of the invention is to be somewhat smaller than the length of the individual cutting edge portions themselves. In that way it is possible for various cutting inserts to be arranged in suitably displaced successive relationship so that, in the gap region which the cutting edges of the preceding cutting insert leave behind, a cutting edge of the next following cutting insert performs its cutting action, while the preceding cutting edges remove material predominantly in the region in which the respective successive cutting insert has a gap or interruption in its cutting edge. Desirably, the width or length of those cutting edge interruptions is of the order of magnitude of between 70 and 90%, preferably around 80% of the length of the individual cutting edge portions.

As already mentioned the ends of the active cutting edges of the cutting inserts should be angled, preferably at about 45°. At the outer ends of the cutting insert those angled ends form a transition to secondary cutting edges which extend substantially perpendicularly to the main cutting edges but are markedly shorter and extend substantially over the thickness of the cutting insert.

The above-specified definitions and structures, in particular the fact that the flanks or relief faces have structures and for example edges which extend in the cutting direction, whereas the cutting direction in turn does not extend perpendicularly to the cutting edge, also entail inter alia the feature that the cutting insert according to the invention, in plan view on to the flank or relief face, is in the form of a parallelogram (which is not right-angled). Rhombic cutting inserts are admittedly known in principle in the state of the art, but in the case of those known cutting inserts the rhombic shape or parallelogram shape is not in a plan view on to a flank but rather in a plan view on to a rake face or the oppositely disposed support face.

Preferably the cutting inserts in accordance with the present invention each have a plurality of independent cutting edges so that they can be turned when one of the cutting edges is worn. Thus, a particularly preferred embodiment of the invention is one in which cutting edges are provided at different rake faces arranged on sides of the cutting insert, which face away from each other. It is also possible to arrange on the same side, that is to say in principle adjoining the same rake face, two respective cutting edges which are respectively formed by the intersection of a rake face with one of the two flanks or relief faces which are on opposite sides. By a combination of those features, it is possible to produce cutting inserts with for example four cutting edges, in which respect the term 'cutting edge' is always used to denote the portion which is active overall in a cutting procedure, even if it comprises a plurality of cutting edge portions which are separated by interruptions.

In a particularly preferred embodiment of the invention the cutting edge or the cutting edge portions belonging to a cutting edge extend in a curved configuration, or the various cutting edge portions extend at a small angle to each other, like closely adjacent tangents to a corresponding circle. Such a circular arc, along which the cutting edges extend, should involve a radius of curvature of the order of magnitude of between 100 and 1000 mm. Instead of a curvedly extending cutting edge which is relatively difficult to produce however it is also possible for example for adjacent cutting edge portions each to extend straight in itself, while however being inclined relative to each other at a small angle which is typically between 1° and 10°, preferably being about 5°. In more general terms, it can be said in respect of curved cutting edges that the ends of a cutting edge, which are respectively remote from each other, (that is to say for example the tangents to the end portions), should include with each other a corresponding angle of between 1° and 10°.

In regard to the milling cutter for the cutting machining of a workpiece the object of the invention is attained in that at least a part of the receiving pockets of the tool body are of such an arrangement or configuration that the respectively active cutting edge of the suitable cutting insert accommodated therein extends inclinedly relative to the axis of the tool body in the peripheral direction thereof. This means that the cutting edge is not inclined for example in a plane which is defined by the associated radius and the axis of the tool body, but in a plane perpendicular thereto, that is to say in a plane which is defined by a tangent to the tool body in the region of the cutting insert and a line parallel to the axis of the tool body. Admittedly this means that the radial spacing of parts of the cutting edge relative to the axis of the tool body is inevitably also slightly altered, but that effect is comparatively slight if the cutting edges are not excessively long and the angle of inclination does not exceed 30°. In other respects however this effect can also be completely compensated if, as already described above, the cutting edges of a cutting insert are slightly angled relative to each other or, better, also extend along a circular arc whose precise radius is determined by the radius of the tool body and by the inclination of the cutting edge relative to the axis of the tool body.

As already mentioned the angle of inclination should be between 5 and 45°, better between 10 and 40° and particularly preferably between 25 and 35°, which means that the receiving pockets are adapted to the cutting inserts in such a way that the corresponding angle of the active cutting edges of at least a part of the cutting inserts is provided by the receiving pockets on the tool body. In particular the active main cutting edges of the cutting inserts on the main tool body should be set in that way while the generally markedly shorter secondary cutting edges can also retain an orientation substantially parallel to the axis of the tool body as they contribute comparatively little to the production of noise. In certain situations of use however it is also possible to envisage a variant in which the secondary cutting edges are also tilted relative to the axis of the tool body in the described manner. In that case the secondary cutting edges of cutting inserts which are arranged on opposite sides of a tool body can also be tilted in the opposite direction. For reasons of space however the receiving pockets for the cutting inserts which are respectively active with their main cutting edges are preferably provided in such a way that all cutting edges of those cutting inserts are inclined substantially in the same direction relative to the axis of the tool body.

A particularly desirable configuration of the tool body is one in which a part of the inserts is arranged in the corner region between the outside surface or periphery of the cylindrical tool body and the two end faces of the tool body, while a further part of the cutting inserts is arranged only in the peripheral region of the cylindrical body.

In that respect a particularly preferred embodiment is one in which all four various groups of cutting inserts are provided on the tool body, which differ substantially by virtue of different axial positions of the cutting inserts. In that respect a first group of cutting inserts is arranged at the transition of an end face of the cylindrical tool body to the peripheral surface in such a way that the cutting inserts project substantially with their secondary cutting edge in a radial direction beyond the tool body. A further group of cutting inserts is arranged in a quite similar manner but possibly displaced in the peripheral direction at the transition of the other end face to the peripheral surface of the cylindrical tool body. The two remaining groups of cutting inserts are arranged along the peripheral surface of the tool body and differ from each other by a slightly displaced axial position, wherein the axial displacement is somewhat less than the length of a cutting edge portion, wherein the cutting inserts have interrupted cutting edges, and the interruption between the cutting edge portions is somewhat smaller than the length of one of the cutting edge portions. In that way cutting edge portions of the one group cut precisely in the region of the gap which is left behind by the cutting edge portions of the other group, and vice-versa.

In addition, the ends of the active main cutting edges, which are respectively axially closest to the end faces of the tool body, should overlap with the secondary cutting edges of the cutting inserts arranged in the corner region between the peripheral surface and the end face. Finally in that case the secondary cutting edges can also project in the radial direction somewhat further than the main cutting edges of the cutting inserts arranged on the peripheral surface. With such an arrangement, the cams of camshafts can be milled in a single working operation to the correct profile, that is to say with a profile of a disk, the edges of which are chamfered.

In a particular embodiment of the present invention, provided at at least a part of the seat surfaces of the main tool body of a milling cutter is a protruding projection which engages into a corresponding opening in a cutting insert received in the seat or the receiving means of the main tool body. Desirably, such a projection is of such a configuration that it engages with as accurate a fit as possible into the corresponding opening in the cutting insert, but bears at least with one of its peripheral surfaces against a boundary surface of the opening in order to secure the cutting insert to prevent lateral displacement thereof in at least one direction relative to the workpiece body. By tightening a clamping screw or another clamping device, the cutting insert can then be pressed both against outer lateral seat surfaces and also against at least one of the projection surfaces and that therefore affords a plurality of contact points which are spaced away from each other and which fix the cutting insert in an accurate position on the tool body. At the same time it is possible in that respect to omit a part of the support surfaces which are otherwise to be provided for precise positioning, along the outer periphery of the cutting insert, and that therefore provides more space on the tool body for a possibly more compact arrangement of adjacent cutting inserts.

It will be appreciated that this configuration of a seat surface with a projection for fixing or positioning a cutting insert on a tool body can also be used more generally and is not limited to use with the inclinedly set cutting edges in a milling cutter according to the present invention.

In the present case, in the illustrated embodiment, the protruding projection is of a substantially trapezoidal cross-section which is substantially adapted to match the trapezoidal cross-section of the openings provided in the cutting inserts. It is also possible to provide a plurality of short projection portions which engage at various positions into a correspondingly longer opening in a cutting insert.

BRIEF DESCRIPTION OF THE DRAWINGS

Further advantages, features and possible uses of the present invention will be apparent from the description hereinafter of a preferred embodiment and the associated Figures in which:

FIG. 2a is a plan view of the cutting insert shown in FIG. 1.

FIG. 2b is a view of the insert of FIG. 2 taken in the direction of arrow B in FIG. 2a.

FIG. 2c is a view of the insert of FIG. 2a taken in the direction of arrow A in FIG. 2a.

FIG. 2d is a plan view of a first modification of the insert.

FIG. 2e is a plan view of a second modification of the insert.

DETAILED DESCRIPTION OF PREFERRED EMBODIMENTS

Figure 1:
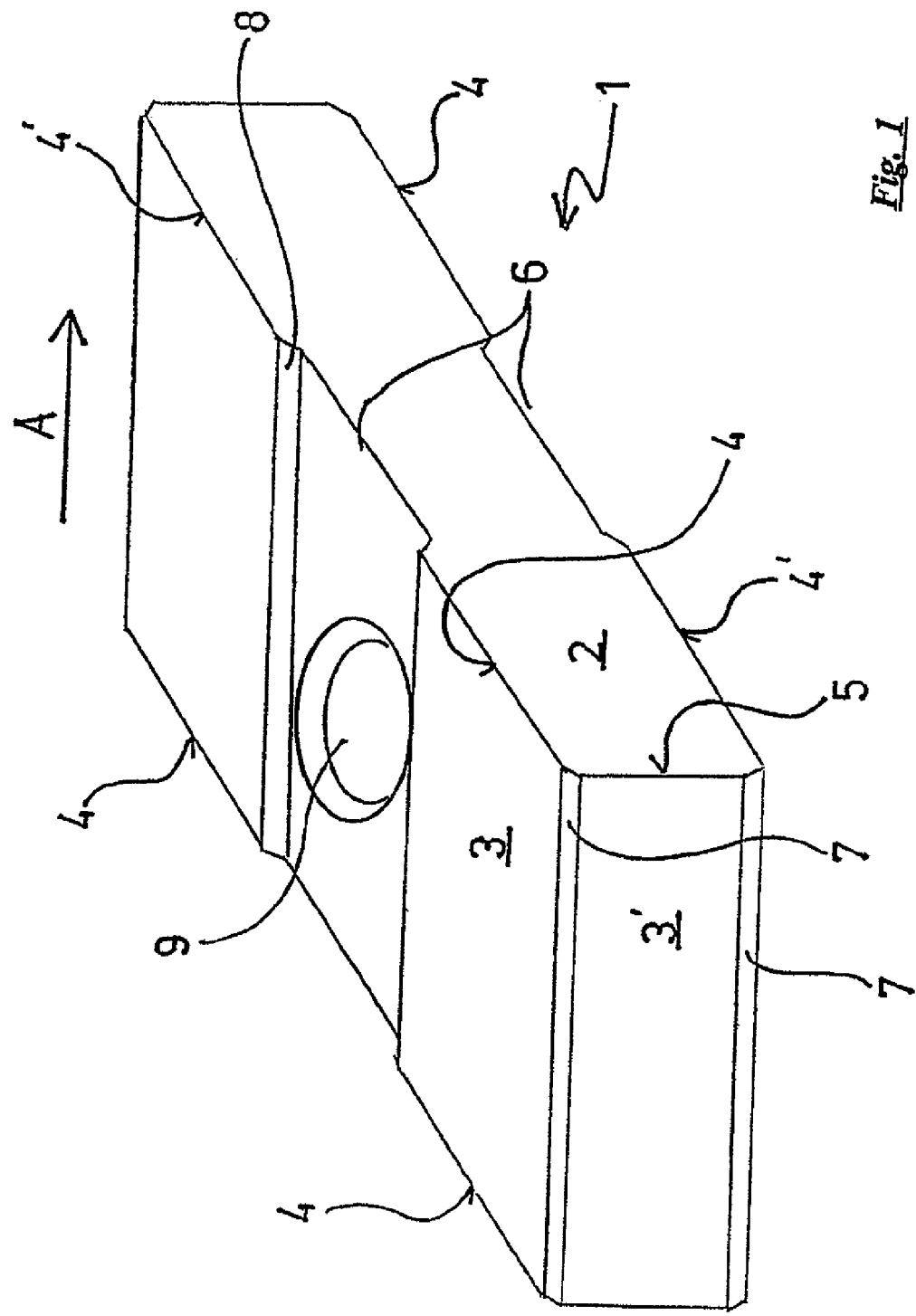
FIG. 1 shows a perspective view of a diagrammatically illustrated embodiment of a cutting insert according to the invention.

Referring to FIG. 1 shown therein is a cutting insert generally identified by reference 1 in the form of a parallelepiped, with two parallel upper and lower faces forming main flanks or relief faces 3, two front and rear faces which define rake faces 2 and finally also two right and left faces 3' which form secondary flanks or relief faces in relation to the secondary cutting edges 5. While the main cutting edges 4, 4' and the secondary cutting edges 5 extend substantially at a right angle to each other, the outer edge structures 7 or also the secondary flanks 3' do not extend at a right angle to the main cutting edges 4. On the contrary, in a plan view on to the flanks 3, the cutting insert is distorted substantially into the shape of a parallelogram, as can be clearly seen from FIGS. 2, 4 and 5. In that respect however FIG. 1 is only a diagrammatic illustration which does not absolutely precisely reproduce the actual proportions involved.

It will also be seen from FIG. 1 that the cutting insert has interrupted main cutting edges 4, 4', wherein the length of the interruption 6, defined by a recess in a respective main flank 3, is somewhat shorter than the length of the main cutting edge portions 4, 4' and wherein further main cutting edges 4, 4' are provided at the rake faces adjoining the rearward side (not visible) of the cutting insert and in addition also provided at the visible front side are cutting edges both along the upper edge of the rake face 2 and also along the lower edge of the rake face 2. Overall therefore the cutting insert shown in FIG. 1 has four main cutting edges which each comprise two cutting edge portions 4, 4'. The ends of the individual main cutting edge portions 4, 4' are respectively angled at about 45° and form a transition into secondary cutting edges 5 at the outer ends of the cutting insert. Adjoining the angle configurations of the main cutting edge portions 4, 4' are corresponding chamfers 7 and 8 respectively where the flanks 3 form junctions with the recess 6. The chamfers 7 and 8 and the edges formed by the intersection of the chamfers and the individual flank portions 3 extend parallel to the arrow A defining the cutting direction of the cutting insert 1. Also provided at the center of the cutting insert is a fixing bore 9 which is only diagrammatically indicated here and which moreover can also extend into the main flanks 3 adjoining the cutting edge portions 4, 4'.

FIG. 2 shows various views of the cutting insert illustrated in FIG. 1, in sub-FIGS. 2a, 2d and 2e. In this respect FIG. 2a corresponds to a perpendicular plan view of the main flanks 3, the fixing bore 9 being shown here somewhat larger than in FIG. 1, that is to say projecting into the main flanks 3. FIG. 2d corresponds to a view of the cutting insert shown in FIG. 2a along the arrow B, and FIG. 2e finally corresponds to a view of the cutting insert shown in FIG. 2a in the direction of or opposite to the direction of the arrow A which again indicates the cutting direction. It will be seen that in that cutting direction the cutting insert 4 roughly approximates to the profile of a digit 8.

FIGS. 2b and 2c show slightly modified variants of the cutting insert which can be seen in FIG. 2a, insofar as in FIG. 2b the two main cutting edge portions 4, 4' are inclined relative to each other and are thus inclined relative to a symmetrically arranged front portion of the interruption 6 through an angle of plus or minus β which is of the order of magnitude of between 1 and 5°. As a result the two cutting edge portions include an angle to each other of a maximum of 10°. In FIG. 2c, instead of the angle configuration of the two cutting edge portions 4, 4', the arrangement has a uniform curvature in respect of the cutting edge configuration 4, 4', wherein the radius of curvature should typically be of an order of magnitude of between 100 and 1000 mm so that the two mutually remote ends of the cutting edge portions 4, 4' have tangents which include with each other an angle of a maximum of 10°, preferably of the order of magnitude of between 1 and 5°. In that respect the radius of curvature to be adopted depends on the diameter at which the cutting insert in question is arranged on the milling cutter, measured from the axis thereof, and the angle of inclination of the cutting edge relative to the cutting direction, or the angle of inclination, which is complementary thereto, with respect to the axis of the milling cutter. Ideally the radius of curvature should be so selected that the cutting edge portions 4, 4' over their entire length are at a constant radial spacing from the axis of the milling cutter, that is to say they are disposed on a notional cylindrical surface about the axis of the tool body, so as to provide a correspondingly constant cutting depth when milling. For rough machining however it is equally well possible to use the insert shown in FIG. 2a, in which respect use of the insert shown in FIG. 2b forms an intermediate stage in machining accuracy.

Figure 3A:
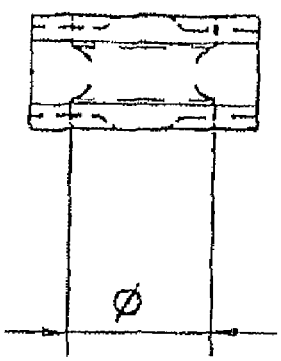
FIG. 3a is a side view of the cutting insert shown in FIG. 1.
Figures 3B, 3C, 3D:
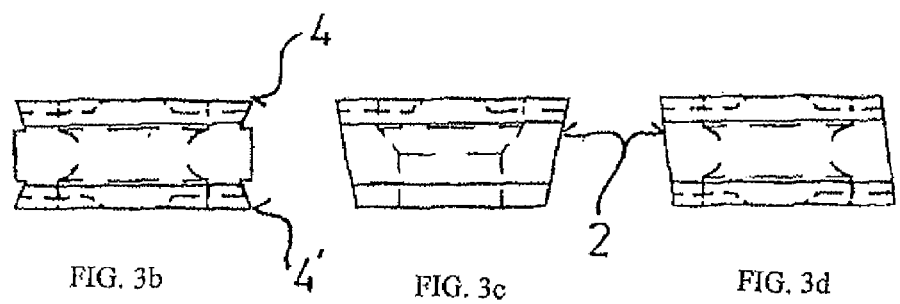
FIG. 3b is a side view of a third modification of the insert.
FIG. 3c is a side view of a fourth modification of the insert.
FIG. 3d is a side view of a fifth modification of the insert.

FIG. 3 shows various sectional and side views of the cutting inserts illustrated in FIG. 2, in particular in FIG. 2a, viewing upwardly, that is to say perpendicularly to the arrow B in FIG. 2. In that respect FIG. 3a corresponds to the shape of the cutting insert shown in FIG. 1, in which the rake faces 2 extend perpendicularly to the flanks or relief faces, so that there is a negative rake angle at least in the milling procedure. The other cross-sectional shapes shown in FIGS. 3b through d permit operation with a positive rake angle. For that purpose, in the embodiment of FIG. 3b, adjoining the main cutting edges 4, 4' there are depressions in the rake face 2, while in the embodiments of FIGS. 3c and 3d the angle between the rake face and the flank or relief face has been reduced, whereby the number of available main cutting edges has also been reduced as in both cases instead of four cutting edges there are only two (positive cutting edges) available. In that respect the embodiment of FIG. 3c is also to be preferred insofar as, after the cutting insert has been turned, it involves the same orientation for the diagonally oppositely disposed cutting edge, while in the case of the embodiment of FIG. 3c, there is a respective mirror-image orientation of the cutting edge configuration, in diagonally opposite relationship. In other words, the inclination of the cutting edge relative to the axis of a milling cutter changes in sign when turning the cutting insert from one cutting edge to the other. That however is also the case with the diagonally opposite main cutting edges 4, 4' of the cutting inserts with a total of four main cutting edges. For the use of such cutting inserts it is therefore desirable if two different types of milling cutters are used, which is revised only by the direction of the inclination of the receiving pockets or the cutting inserts received therein, along the periphery of the milling cutter. That is also desirable in particular in relation to camshaft milling cutters because, in the case of camshaft milling cutters, a plurality of corresponding disk milling cutters generally come into engagement in any case simultaneously with a camshaft, so that those disk milling cutters should respectively have in pairs a milling cutter of one type and a milling cutter of the other type, in order to be able to make optimum use of the cutting inserts by exchanging them when changing the main cutting edges between the two milling cutters, if a main cutting edge with the correct symmetry for the previous milling cutter is no longer available.

That will be better understood from the description relating to FIGS. 4 and 5 which show a portion of a milling cutter and the arrangement of the cutting inserts on such a milling cutter.

Figure 4A:
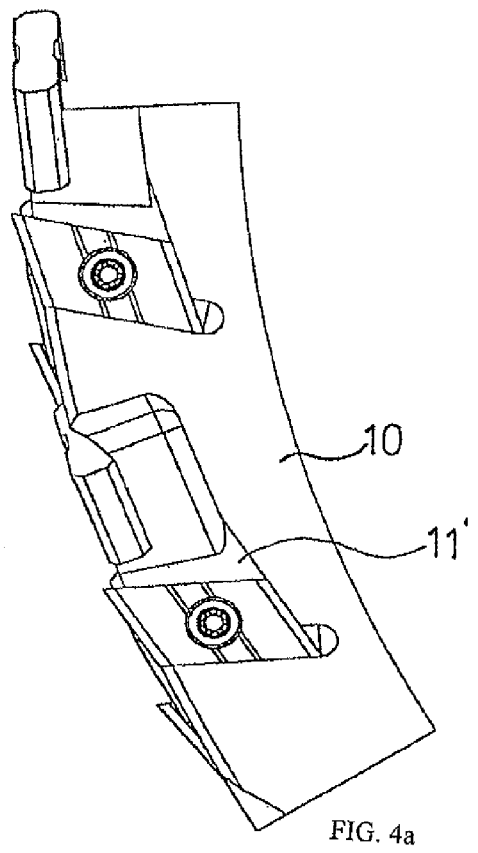
FIG. 4a is a fragmentary view of a tool body in a direction parallel to an axis of rotation thereof.
Figure 4B:
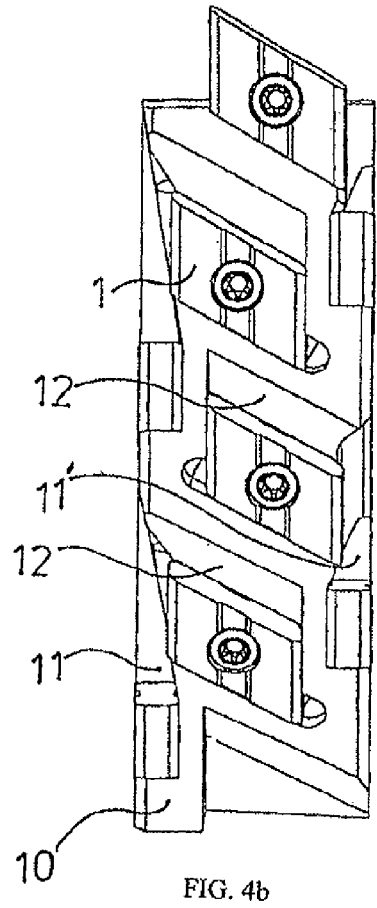
FIG. 4b is a view of the cutting body in a direction perpendicular to the axis of rotation.

FIG. 4a shows a peripheral portion of a tool body 10 which is substantially in the form of a circular disk defining an axis of rotation AR and which has receiving pockets 11' for cutting inserts 1 which are arranged along the corner region between an end face 10a and the peripheral surface 10b of the tool body 10. FIG. 4b shows a plan view of the peripheral surface.

Figure 4C:
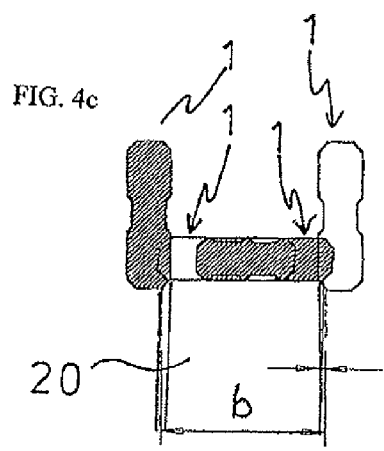
FIG. 4c is a schematic illustration of two inserts disposed at axial ends of the tool body, and one insert disposed on the peripheral surface of the tool body.

It will be seen in this respect that in both corner regions at the transition of the end faces to the peripheral surface of the milling cutter 10, receiving pockets 11 and 11' respectively are arranged alternately, with a respective cutting insert 1 being received in each of the pockets. Provided also along the peripheral surface are receiving pockets 12 and 12' respectively which each define a seat for the cutting plates 1, wherein the receiving pockets 12 and 12' alternate in the peripheral direction and differ only by virtue of their axial position. The cutting inserts 1 in the receiving pockets 12 are displaced somewhat towards the left with respect to the cutting inserts 1 in the receiving pockets 12', more specifically in such a way that the interruptions between the cutting edges of the one group of cutting inserts are respectively covered by cutting edges of the other group of cutting inserts. In addition the cutting edges of the cutting inserts arranged in the receiving pockets 12 and 12' respectively also respectively overlap with one of the group of cutting inserts which are arranged in the receiving pockets 11 and 11' respectively. In a tangential view in the peripheral direction in which the successive cutting inserts are shown in the same plane, it is possible to see the profile 20 formed by that arrangement, as is illustrated in FIG. 4c. In order better to distinguish the individual cutting inserts from each other, in that case the left, vertically arranged cutting insert and the right horizontal cutting insert are respectively identified by hatching. As will be seen therefrom the cutting inserts arranged in the pockets 11, 11' cut with their secondary edges 5 which project in the radial direction somewhat further than the main cutting edges 4, 4' of the horizontally arranged cutting inserts 1 which cut the central part of a profile or cam 20. As a result the milling cutting edges at the transition between the secondary cutting edges 5 and the main cutting edges 4 come into engagement with the edges of the profile 20, so that overall the result produced is a cam or disk profile with beveled edges.

Figure 5A:
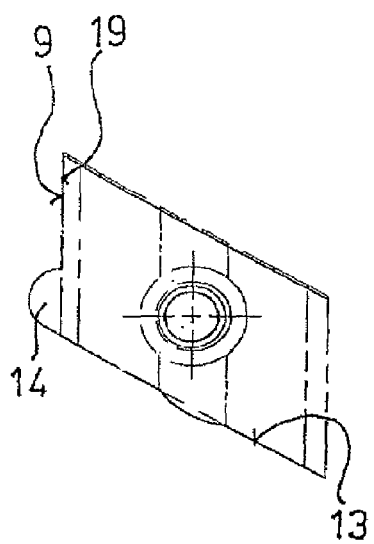
FIG. 5a is a plan view of a seat on the tool body, wherein the seat has two upstanding contacting faces for engaging a cutting insert.
Figure 5B:
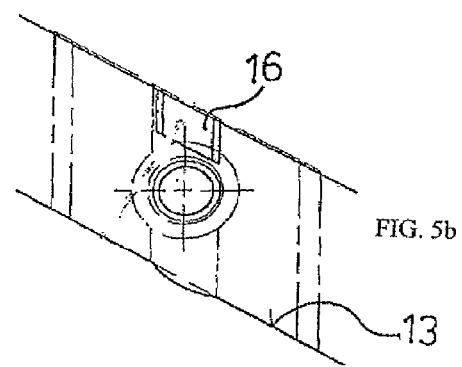
FIG. 5b is a plan view of a seat on the tool body wherein the seat has only one upstanding contact face.
Figure 5C:
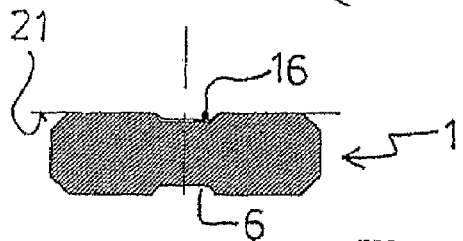
FIG. 5c is a side view of a cutting insert mounted in a seat such that a projection of the seat enters a recess of the cutting insert.

FIG. 5 shows in sub-FIGS. 5a, 5b and 5c various alternative fixing configurations for the cutting inserts 1 and FIG. 5d again shows in a development the precise arrangement of the cutting inserts 1, corresponding to the view in FIG. 4b. FIG. 5a shows a receiving pocket which, by virtue of faces 13 and 19 which are angled relative to each other, defines a seat for a reversible cutting plate 1, while a relief groove 14 can be seen at the transition of the faces 13, 19. A rake face of the cutting insert 1 bears against the face 13 and a secondary flank face 5 bears against the face 9. FIGS. 5b and c show an alternative configuration in which there is only one contact face 13, wherein instead of a further contact face 19 it is possible to see a projection 16 at the bottom of the plate seat, which engages into the depression formed in the flank 3 by the opening 6, and thereby defines a clearly defined plate seat. The projection 16 is of a trapezoidal cross-section which is precisely matched to the trapezoidal cross-section of the openings 16 in the cutting bits 1. In plan view it also appears substantially in the form of a parallelogram with the same parallelogram angles as the cutting insert and its lateral contact faces which clearly fix the cutting insert 1 in the axial direction with respect to the tool body 10 extended parallel to the peripheral direction or the cutting direction.

It will be appreciated that a corresponding projection 16 could additionally be provided also on the other side of the fixing bore in order to fix the cutting insert in the above-mentioned axial direction at two points which are remote from each other. It will be noted that this function is also performed in any case by the contact face 13 which supports the cutting insert 1 in the peripheral direction and thus against the cutting forces which act at the cutting edges.

Figure 5D:
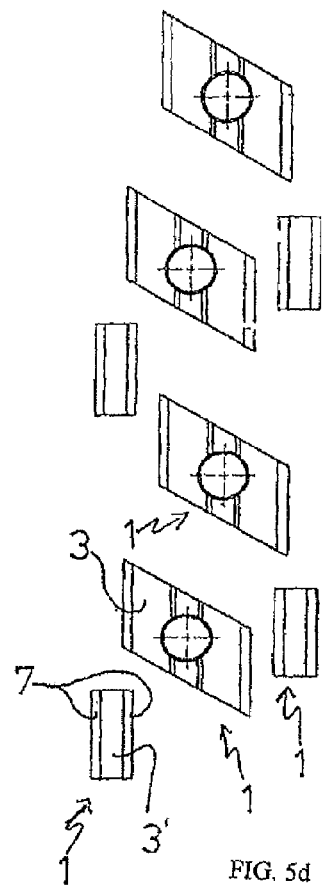

It will be clear from FIG. 5d how the individual plates are displaced relative to each other and thereby overall define the profile illustrated in FIG. 4c.

Figure 6:
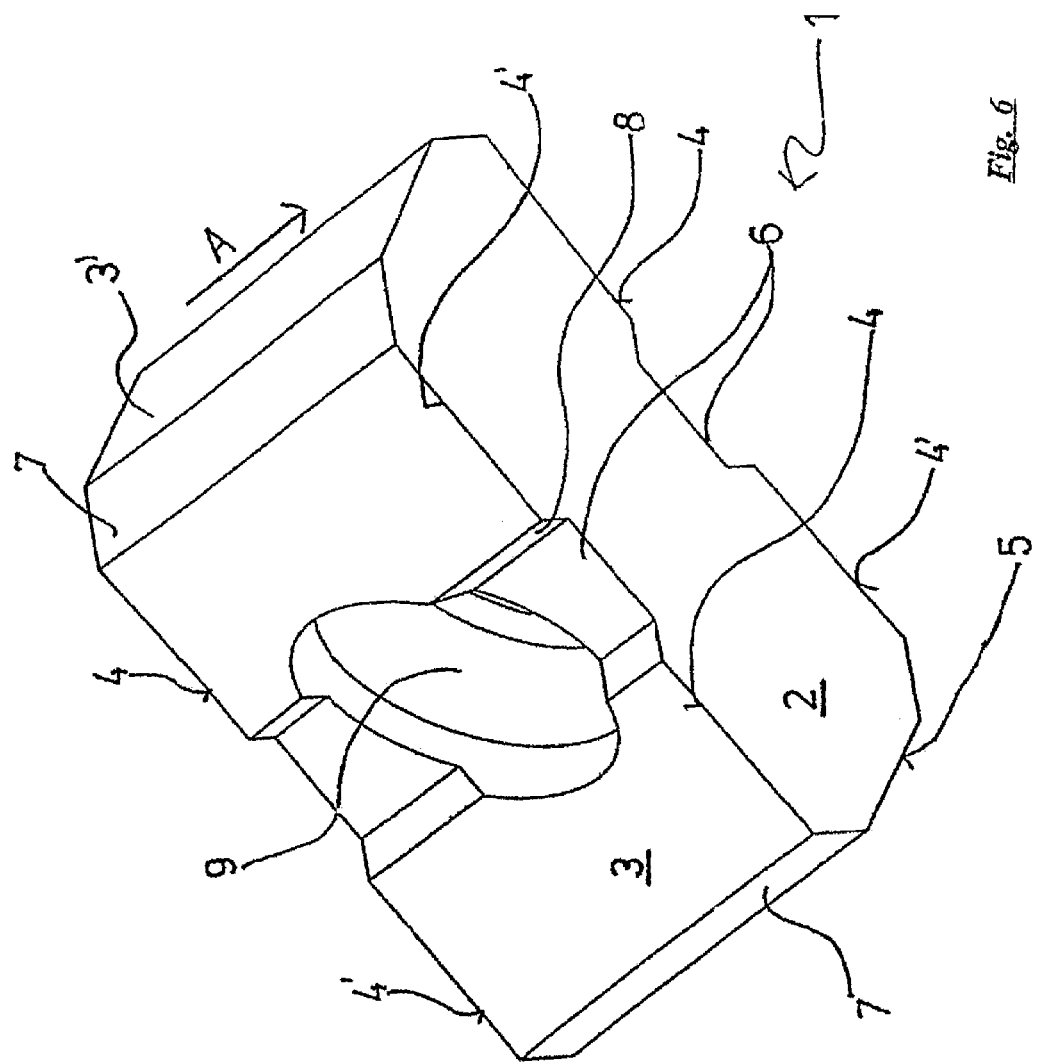
FIG. 6 shows a perspective view of a realistically reproduced first embodiment of a cutting insert according to the invention.
Figure 7:
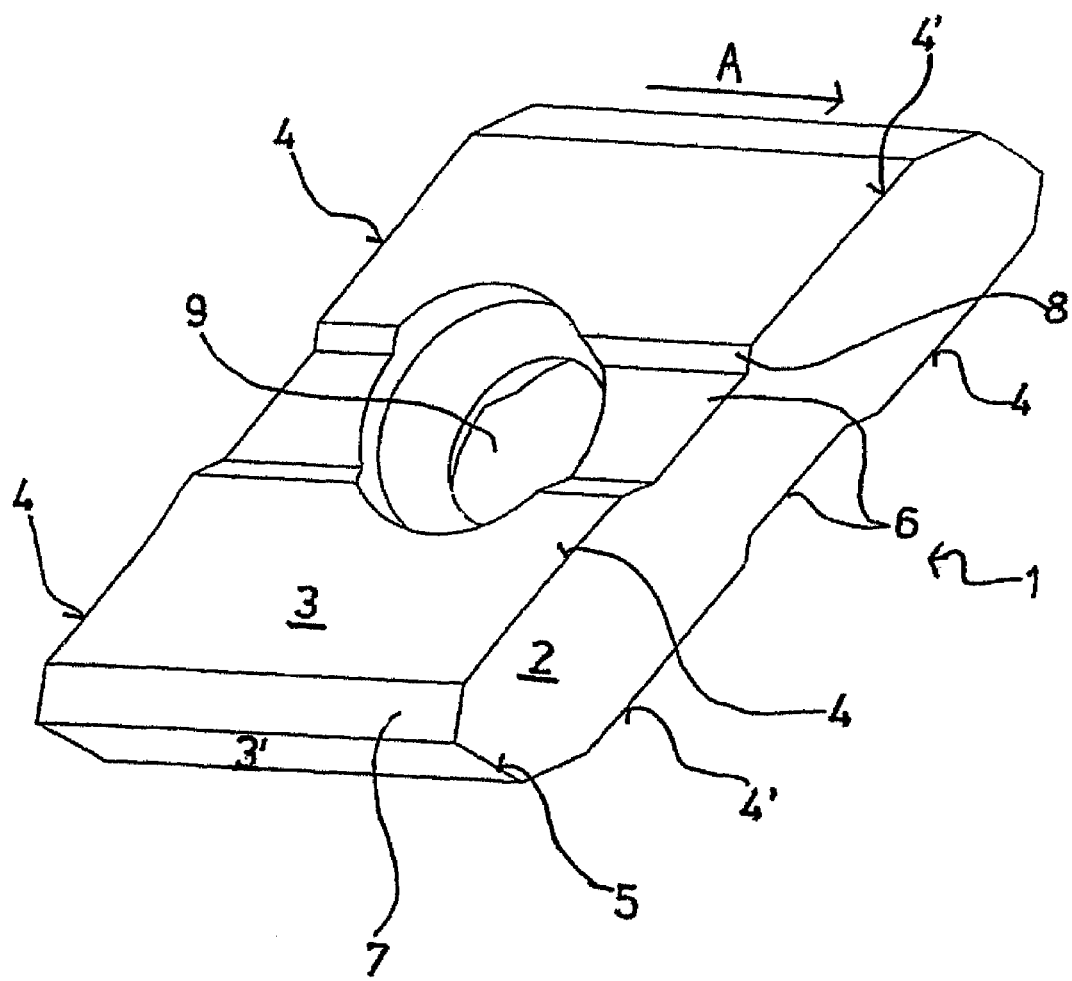
FIG. 7 shows a perspective view of a realistically reproduced embodiment of a cutting insert according to the invention.

FIGS. 6 and 7 show two embodiments of the present invention in a substantially realistic perspective view. As can be easily appreciated by means of comparison with FIG. 1, all faces, edges, openings and so forth defined in the description relating to FIG. 1 are also present in the same manner in the embodiments shown in FIGS. 6 and 7. Only the proportions of the individual elements relative to each other are somewhat different from the view in FIG. 1.

The invention claimed is:

1. A milling cutter for the cutting machining of a workpiece, the cutter comprising a tool body having a substantially circular cross section defining a center axis with a plurality of pockets distributed around the periphery of the tool body and cutting inserts received in respective ones of the pockets; each insert comprising a rake face, a main flank, a secondary flank intersecting the rake face and the main flank, and at least one main cutting edge formed by an intersection of the rake face and the main flank; the cutting insert, as viewed in a direction perpendicular to the main flank, being shaped as a parallelogram which is not right-angled, wherein the at least one main cutting edge extends an angle other than 90° relative to the cutting direction; wherein the cutting direction is parallel to the secondary flank; the cutting inserts being arranged with the cutting edge being in an active position inclined relative to the center axis by an angle of inclination in the range of 10 and 40°, wherein the flank of each cutting insert includes a recess dividing the main cutting edge into first and second cutting edge portions, wherein the tool body includes a cylindrical peripheral surface and inserts disposed in pockets disposed in said peripheral surface, wherein there are two groups of cutting inserts disposed in said peripheral surface which are axially offset from one another, and wherein the flank of each insert includes an interruption region dividing the main cutting edge into spaced-apart cutting edge portions, the cutting inserts being arranged in an overlapping relationship with their cutting edges such that one of the two groups of the cutting inserts arranged on the peripheral surface of the tool body is arranged relative to the other one of those two groups in such a way that a respective one of the main cutting edge portions of the one group covers the interruption regions of the other group.

2. The milling cutter as set forth in claim 1 wherein the angle of inclination is in the range of 25 and 35°.

3. The milling cutter as set forth in claim 1 wherein the active main cutting edges of all of the inserts have the same angle of inclination.

4. The milling cutter as set forth in claim 3 wherein the main cutting edges of all of the inserts are inclined in the same direction with respect to the center axis.

5. The milling cutter as set forth in claim 1 wherein each insert further includes secondary flanks, which form secondary cutting edges at an intersection with the rake face, an active one of the secondary cutting edges being inclined relative to the center axis.

6. The milling cutter as set forth in claim 1 wherein the tool body includes a cylindrical peripheral surface and end faces at opposite ends of the peripheral surface, some of the inserts disposed in pockets disposed only in the peripheral surface, and others of the inserts disposed in corners formed between the peripheral surface and the end faces.

7. The milling cutter according to claim 6 wherein there are four groups of the cutting inserts, each group comprising an annular row of inserts extending around an outer periphery of the tool body, two of the groups disposed in respective ones of the corners, and the other two of the groups disposed in the peripheral surface; the other two groups being offset axially from one another.

8. The milling cutter according to claim 7 wherein the ends of the main cutting edges of a respective one of the groups overlap secondary cutting edges of the cutting inserts arranged in the corner regions.

9. The milling cutter as set forth in claim 7 wherein each seat of the tool body includes a projection entering the recess of a respective cutting inserts.

10. The milling cutter as set forth in claim 9 wherein each projection secures a respective cutting insert against displacement with respect to the seat in at least one direction.

11. The milling cutter according to claim 10 wherein each seat disposed in a cylindrical peripheral surface of the tool body has its projection arranged to fix the respective cutting insert against movement in a direction along the center axis.

12. The milling cutter as set forth in claim 1 wherein the at least one main cutting edge comprises at least a first cutting edge portion and a second cutting edge portion spaced from the first cutting edge portion by the interruption region.

13. The cutting insert as set forth in claim 12 wherein the first cutting edge portion has a radius of curvature such that the first cutting edge portion and the second cutting edge portion over their entire length are at a constant radial spacing from the center axis.

14. The milling cutter as set forth in claim 1 wherein the at least one main cutting edge is slightly curved.

15. The cutting insert as set forth in claim 13 wherein a radius of curvature of the at least one main cutting edge is greater than 300 mm and smaller than 2000 mm.

16. The cutting insert as set forth in claim 12 wherein the first edge portion and the second cutting edge portion are linear and are angled relative to each other.

17. The cutting insert as set forth in claim 15 wherein the first cutting edge portion and the second edge portion are angled relative to each other at an angle which is greater than 1° and less than 10°.

18. A milling cutter for the cutting machining of a workpiece, the cutter comprising a tool body having a substantially circular cross section defining a center axis with a plurality of pockets distributed around the periphery of the tool body and cutting inserts received in respective ones of the pockets; each insert comprising a rake face, a main flank, a secondary flank intersecting the rake face and the main flank, and at least one main cutting edge formed by an intersection of the rake face and the main flank; the cutting insert, as viewed in a direction perpendicular to the main flank, being shaped as a parallelogram which is not right-angled, wherein the at least one main cutting edge extends at an angle other than 90° relative to the cutting direction; wherein the cutting direction is defined by the circumferential direction of the tool body and perpendicular to an axial direction; the cutting inserts being arranged with the cutting edge being in an active position inclined relative to the center axis by an angle of inclination in the range of 10 and 40°, wherein the tool body includes a cylindrical peripheral surface and end faces at opposite ends of the peripheral surface, some of the inserts disposed in pockets disposed only in the peripheral surface, and others of the inserts disposed in corners formed between the peripheral surface and the end faces, wherein there are four groups of the cutting inserts, each group comprising an annular row of inserts extending around an outer periphery of the tool body, two of the groups disposed in respective ones of the corners, and the other two of the groups disposed in the peripheral surface; the other two groups being offset axially from one another, and wherein the flank of each insert includes an interruption region dividing the main cutting edge into spaced-apart cutting edge portions, the cutting inserts arranged in overlapping relationship with their cutting edges arranged in such a way that one of the two groups of the cutting inserts arranged on the peripheral surface of the tool body is arranged relative to the other of those two groups in such a way that a respective one of the main cutting edge portions of the one group covers the interruption regions of the other group and wherein the ends of the main cutting edges of a respective one of the groups overlap with the secondary cutting edges of the cutting inserts arranged in the corner regions.

19. A milling cutter for the cutting machining of a workpiece, the cutter comprising a tool body having a substantially circular cross section defining a center axis with a plurality of pockets distributed around the periphery of the tool body and cutting inserts received in respective ones of the pockets; each insert comprising a rake face, a main flank, a secondary flank intersecting the rake face and the main flank, and at least one main cutting edge formed by an intersection of the rake face and the main flank; the cutting insert, as viewed in a direction perpendicular to the main flank, being shaped as a parallelogram which is not right-angled, wherein the at least one main cutting edge extends at an angle other than 90° relative to the cutting direction; wherein the cutting direction is defined by the circumferential direction of the tool body and perpendicular to an axial direction; the cutting inserts being arranged with the cutting edge being in an active position inclined relative to the center axis by an angle of inclination in the range of 10 and 40°, wherein the flank of each cutting insert includes a recess dividing the main cutting edge into first and second cutting edge portions, wherein the tool body includes a cylindrical peripheral surface and inserts disposed in pockets disposed in said peripheral surface, wherein there are two groups of cutting inserts disposed in said peripheral surface which are axially offset from one another, and wherein the flank of each insert includes an interruption region dividing the main cutting edge into spaced-apart cutting edge portions, the cutting inserts being arranged in an overlapping relationship with their cutting edges such that one of the two groups of the cutting inserts arranged on the peripheral surface of the tool body is arranged relative to the other one of those two groups in such a way that a respective one of the main cutting edge portions of the one group covers the interruption regions of the other group.

20. A milling cutter for the cutting machining of a workpiece, the cutter comprising a tool body having a substantially circular cross section defining a center axis with a plurality of pockets distributed around the periphery of the tool body and cutting inserts received in respective ones of the pockets; each insert comprising a rake face, a main flank, a secondary flank intersecting the rake face and the main flank, and at least one main cutting edge formed by an intersection of the rake face and the main flank; the cutting insert, as viewed in a direction perpendicular to the main flank, being shaped as a parallelogram which is not right-angled, wherein the at least one main cutting edge extends an angle other than 90° relative to the cutting direction; wherein the cutting direction is parallel to the secondary flank; the cutting inserts being arranged with the cutting edge being in an active position inclined relative to the center axis by an angle of inclination in the range of 10 and 40°, wherein the tool body includes a cylindrical peripheral surface and end faces at opposite ends of the peripheral surface, some of the inserts disposed in pockets disposed only in the peripheral surface, and others of the inserts disposed in corners formed between the peripheral surface and the end faces, wherein there are four groups of the cutting inserts, each group comprising an annular row of inserts extending around an outer periphery of the tool body, two of the groups disposed in respective ones of the corners, and the other two of the groups disposed in the peripheral surface; the other two groups being offset axially from one another, and wherein the flank of each insert includes an interruption region dividing the main cutting edge into spaced-apart cutting edge portions, the cutting inserts arranged in overlapping relationship with their cutting edges arranged in such a way that one of the two groups of the cutting inserts arranged on the peripheral surface of the tool body is arranged relative to the other of those two groups in such a way that a respective one of the main cutting edge portions of the one group covers the interruption regions of the other group and wherein the ends of the main cutting edges of a respective one of the groups overlap with the secondary cutting edges of the cutting inserts arranged in the corner regions.

21. The milling cutter as set forth in claim 20 wherein the angle of inclination is in the range of 25 and 35°.

22. The milling cutter as set forth in claim 20 wherein the active main cutting edges of all of the inserts have the same angle of inclination.

23. The milling cutter as set forth in claim 22 wherein the main cutting edges of all of the inserts are inclined in the same direction with respect to the center axis.

24. The milling cutter as set forth in claim 20 wherein each insert further includes secondary flanks, which form secondary cutting edges at an intersection with the rake face, an active one of the secondary cutting edges being inclined relative to the center axis.

25. The milling cutter as set forth in claim 20 wherein each seat of the tool body includes a projection entering the interruption region of a respective cutting insert.

26. The milling cutter as set forth in claim 25 wherein each projection secures a respective cutting insert against displacement with respect to the seat in at least one direction.

27. The milling cutter according to claim 26 wherein each seat disposed in a cylindrical peripheral surface of the tool body has its projection arranged to fix the respective cutting insert against movement in a direction along the center axis.

28. The milling cutter as set forth in claim 20 wherein the at least one main cutting edge is slightly curved.

29. The milling cutter as set forth in claim 20 wherein the at least one main cutting edge is interrupted by a spacing and comprises at least a first cutting edge portion and a second cutting edge portion spaced from the first cutting edge portion by the spacing.

30. The milling cutter as set forth in claim 29 wherein the first cutting edge portion has a radius of curvature such that the first cutting edge portion and the second cutting edge portion over their entire length are at a constant radial spacing from the center axis.

31. The milling cutter as set forth in claim 30 wherein a radius of curvature of the at least one main cutting edge is greater than 300 mm and smaller than 2000 mm.

32. The milling cutter as set forth in claim 31 wherein the first cutting edge portion and the second cutting edge portion are angled relative to each other at an angle which is greater than 1° and less than 10°.

33. The milling cutter as set forth in claim 29 wherein the first cutting edge portion and the second cutting edge portion are linear and are angled relative to each other.

* * * * *